UNITED STATES PATENT OFFICE

KARL DAIMLER AND KARL PLATZ, OF FRANKFORT-ON-THE-MAIN-HOCHST, GERMANY, ASSIGNORS TO I. G. FARBENINDUSTRIE AKTIENGESELLSCHAFT, OF FRANKFORT-ON-THE-MAIN, GERMANY

ESTER-LIKE CONSTITUTED WETTING AGENTS, FOAMING AGENTS, AND DISPERSING AGENTS AND PROCESS OF PREPARING THEM

No Drawing. Application filed October 24, 1930, Serial No. 491,082, and in Germany October 31, 1929.

The present invention relates to ester-like constituted wetting agents, foaming agents and dispersing agents and process of preparing them.

We have found that the hydroxylated or halogenated derivatives of the ethane sulfonic acid can be caused to react with the higher fatty acids so as to form ester-ethane-sulfonic acids having the general formula:

wherein R stands for an aliphatic hydrocarbon radicle having more than 3 carbon atoms. Said ester-ethane-sulfonic acids possess remarkable soap-like particularly wetting and emulsifying properties. If hydroxy-ethane-sulfonic acid or the salts thereof are used as one component, the said new products are obtained for instance by causing the sulfonic acid component to react with the acid chlorides of higher fatty acids. When using halogenated ethane-sulfonic acids as one of the components, the reaction products in question are obtained by treating the sulfonic acid component with the salts of the higher fatty acids. The process may also be carried out by using ethionic acid or the anhydride thereof, the carbyl sulfate, instead of the hydroxy-ethane-sulfonic acid itself, during which operation the rest of the fatty acid enters the molecule instead of the sulfuric acid splitting off from the ethionic acid or the carbyl sulfate. The sulfuric acid splitting off may in some cases have a sulfonating action upon the fatty acid used, without the properties of the reaction product being considerably altered thereby. Instead of the fatty acids or the fatty acid chlorides there may be used the esters thereof for the reaction with ethionic acid or carbyl sulfate.

The component of sulfonic acid character may also be caused to react with the component of fatty acid character in the presence of a distilling solvent, there being preferably chosen a solvent of a relatively low boiling point. This method of working is to be recommended particularly if a component of sulfonic acid character containing hydroxyl is caused to react with an acid chloride.

The reaction is preferably carried out as follows: The component containing hydroxyl is first suspended in the solvent and so much of the solvent is distilled until no water any longer distills over. As soon as the complete dehydration of the component containing hydroxyl is guaranteed, the acid chloride is gradually added; if required it is diluted by an anhydrous solvent. By the distillation of the solvent, which is continued without interruption during this reaction, it is possible that besides keeping the reaction mass permanently dry, the hydrochloric-acid gas which is formed is always eliminated in a uniform and quantitative manner; thus a continuous displacement of equilibrium takes place which leads to a complete reaction. During the reaction the anhydrous solvent may always be added again in such a quantity as it is distilled.

When the evolution of hydrochloric acid is complete, there is obtained a mass which is more or less dissolved in the solvent and which in most cases is acid. If the mass is to be neutralized for further use, the neutralization is carried out—contrary to the usual method of working—in the absence of water, for instance by means of dry ammonia gas. Ammonia gas, dissolved in a solvent or anhydrous sodium carbonate or another anhydrous neutralizing agent having an alkaline reaction may likewise be used. As soon as complete neutralization is obtained, the rest of the solvent is distilled, if required, or the mixture is subjected to a steam distillation which can best be carried out by adding water to the product which has already preliminarily been freed as much as possible from the solvent; the whole is then further heated until the remainder of the solvent has distilled with the water. A saponification with formation of the alkali salt of the fatty acid can no longer take place in this case because the corresponding esters are readily cleavable in the heat only in acid or alkaline media, but when neutral they can bear boiling. According to the above described method of working the formation of ester is always quantitative.

It is a surprising fact that the reaction products of the hydroxy-ethane-sulfonic acid obtained have in many respects an analogous behavior to the alkylated naphthalene sulfonic acids known as wetting agents or the highly sulfonated fatty acids, i. e. that they have a great foaming and wetting effect in an acid as well as in an alkaline solution, that they give no precipitation with many metallic salts and the like, so that they are particularly appropriate for being used in such media as exclude the use of normal soap or weakly sulfonated fats.

The alkali metal salts and the salts of the alkaline earth metals of the reaction products are colorless solid bodies. Some of them are already soluble in cold water; all of them and the heavy-metal salts dissolve in hot water. The esters are rather resistant towards dilute cold mineral acids and alkalies.

The following examples serve to illustrate the invention, but they are not intended to limit it thereto, the parts being by weight:

(1) 80 parts of sodium hydroxy-ethane sulfonate are gradually added to 150 parts of oleic acid chloride at a temperature between 30° C. and 40° C. while stirring; as soon as the evolution of hydrochloric acid has somewhat decreased, the temperature is raised to 80° C.–100° C. After stirring has been continued for some hours, an acidified test sample is soluble in water to a clear solution and resistant to acid.

The reaction product is thoroughly kneaded with calcinated sodium carbonate until neutralization has taken place; it then constitutes a weakly yellow, loose fatty powder which is already soluble in cold water. In order to obtain the product in a pure state, it is recrystallized from ethyl alcohol. The reaction probably takes place according to the equation:

$$C_{17}H_{33}COCl + OH.CH_2.CH_2.SO_3Na \rightarrow C_{17}H_{33}COO\ C_2H_4\ SO_3Na + HCl.$$

The sodium salt of the oleic acid ester of the hydroxy-ethane-sulfonic acid is a fatty powder which difficultly dissolves in cold water, but readily dissolves in hot water. It possesses the property of reducing greatly the surface tension of solutions, particularly if heat is applied; it is capable of dispersing lime soap and many dyestuffs and of rendering many dyeings fast to rubbing; it possesses a good washing power even in hard water and is suitable among others for the preparation of emulsions.

(2) 160 parts of sodium ricinoleate are kneaded with 100 parts of sodium chloroethane sulfonate and heated to a temperature of between 80° C. and 200° C. while stirring. Stirring is continued until the product is soluble in water and resistant to acid.

The reaction product obtained resembles in its outward appearance to that of Example 1. For a further purification it is worked up as described in Example 1. The reaction probably takes place according to the equation:

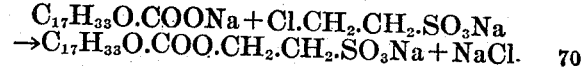

$$C_{17}H_{33}O.COONa + Cl.CH_2.CH_2.SO_3Na \rightarrow C_{17}H_{33}O.COO.CH_2.CH_2.SO_3Na + NaCl.$$

(3) To 200 parts of ethionic acid obtained from ethyl alcohol and surfuric anhydride 280 parts of stearic acid are added at a temperature of 45° C. while stirring. Stirring is continued for 10 hours at this temperature. The mixture is then introduced into 300 parts of ice water while stirring and the whole is washed with a solution of sodium chloride. By neutralization a white paste is obtained which dissolves when diluted with water. The reaction probably takes place according to the equation:

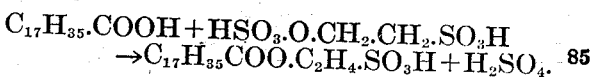

$$C_{17}H_{35}.COOH + HSO_3.O.CH_2.CH_2.SO_3H \rightarrow C_{17}H_{35}COO.C_2H_4.SO_3H + H_2SO_4.$$

(4) 85 parts of dry sodium hydroxy-ethanesulfonate (of about 85 per cent. strength) are introduced, while stirring, into 155 parts of castor oil; a current of dry hydrochloric-acid gas is passed through the mixture, while stirring. After stirring has been continued for 15–20 hours, the reaction is complete. The reaction product is soluble in water to a clear solution. It is introduced, while stirring, into 400 parts of ice water, 100 parts of a saturated solution of sodium chloride are added thereto and the whole is allowed to deposit. The upper layer is taken off and the under layer containing the ricinoleic acid ester of the hydroxy-ethane sulfonic acid is again washed with a solution of sodium chloride of 20 per cent. strength and neutralized.

(5) 120 parts of molten coconut oil are caused to run during 1 hour into 103 parts of ethionic acid. The mixture is stirred at a temperature of between 25° C. and 35° C. until alcoholysis has taken place and the reaction product is soluble in water to a clear solution. The reaction product is worked up as described in Example 4.

(6) 180 parts of a mixture of fatty acid consisting of single links with 6–12 carbon atoms each which is obtained by oxidation of paraffin oil are stirred together with 170 parts of dry sodium hydroxy-ethane sulfonate of 85 per cent. strength (containing sodium chloride) at a temperature of between 30° C. and 40° C. while passing hydrochloric-acid gas through the mixture, until the product is soluble in water to a clear solution. The sodium chloride which has been formed during the reaction or which has been introduced into the reaction mixture by the sodium hydroxy-ethane sulfonate is then filtered off by suction. Before the filtration by suction takes place, such a quantity of ammonia gas may be introduced as corresponds to the content of dissolved hydrochloric-acid gas. The ammonium chloride formed with the gaseous hydrochloric acid may then likewise be eliminated by filtration.

A 100 per cent. oily mass free from hydrochloric acid is obtained which is completely soluble in water and possesses the property of mixing without difficulty with various oils, for instance with oleic acid. Thus by mixing about 5–10 per cent. of the conversion product with 85–90 per cent. of oleic acid there can be produced an oil to be used in the textile industry capable of being emulsified in water and well applicable as an oil for spinning.

The conversion product may also be neutralized and then be used as a textile adjuvant, a wetting agent, a washing agent and the like. For the course of the reaction the schematic formula may be given:

in which R stands for a radicle of fatty acid.

(7) 1 mol of sodium hydroxy-ethanesulfonate is heated with 6 mols of benzene until no water any longer distills over with the benzene. 1 mol of oleic acid chloride dissolved in 1 mol of anhydrous benzene is then introduced thereto, drop by drop, at a temperature of about 80° C. while the benzene is eliminated by distillation. If required, benzene (anhydrous) is added again. As soon as the evolution of hydrochloric acid is complete, the mixture is neutralized by introduction of dry ammonia, the benzene is distilled except a small residue, 5 mols of hot water are added and the temperature is maintained at about 110° C. until the water distills free from benzene. The condensation product as obtained may be used as a highly concentrated aqueous paste or it may be further dried, if required. The product constitutes an excellent washing agent, particularly for removing fat from raw wool.

(8) 400 parts of the acid chloride of an acid of bleached Montan wax are caused to react with 200 parts of sodium hydroxy-ethane-sulfonate as described in Example 7. The reaction product is a weakly yellow fatty powder which due to its capability of thickening in the cold serves as an emulsion carrier.

We claim:

1. The process which comprises causing a compound of the general formula:

X—CH₂
|
Y—CH₂ wherein X may stand for SO₃H, Y may stand for a substituent of the group consisting of OH, O.SO₃H, halogen or X and Y together may stand for the group

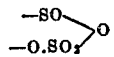

to react with a fatty acid compound of the general formula:

R.CO.Z wherein Z stands for OH, O.metal, O.alkyl or a halogen atom and R represents an aliphatic hydrocarbon radicle, the molecule of which contains more than 3 carbon atoms.

2. The process which comprises causing a compound of the general formula:

X.CH₂.CH₂.SO₃H wherein X stands for OH or a halogen atom to react with a fatty acid compound of the general formula:

R.CO.Z wherein Z stands for OH, O.metal, O.alkyl or a halogen atom and R represents an aliphatic hydrocarbon radicle, the molecule of which contains more than 3 carbon atoms.

3. The process which comprises causing hydroxy-ethane-sulfonic acid to react with the acid chloride of a fatty acid the molecule of which contains more than 3 carbon atoms.

4. The process which comprises causing chloro-ethane-sulfonic acid to react with a metal salt of a fatty acid, the molecule of which contains more than 3 carbon atoms.

5. The process which comprises causing hydroxy-ethane-sulfonic acid to react with oleic acid chloride at a temperature of 80° C.–100° C.

6. The process which comprises causing hydroxy-ethane-sulfonic acid to react with oleic acid chloride in the presence of an organic inert solvent.

7. The process which comprises causing hydroxy-ethane-sulfonic acid to react with oleic acid chloride in the presence of benzene.

8. As a new product, the condensation product of the general formula:

HO₃S.C₂H₄.O.OC.R wherein R stands for an aliphatic hydrocarbon radicle having more than 3 carbon atoms, the alkali metal salts and the salts of the alkaline earth metals thereof being colorless, solid bodies which for the greatest part readily dissolve in cold water, but all dissolve in hot water as well as the heavy metal salts of the condensation products, the alkali metal salts and the salts of the alkaline earth metals being resistant towards cold mineral acids and cold alkalies.

9. As a new product, the condensation product of the formula:

HO₃S.C₂H₄.O.OC.C₁₇H₃₃ the sodium salt thereof being a fatty powder difficultly soluble in cold water, but readily soluble in hot water and being capable of reducing the surface tension of solutions and of dispersing lime soap and many dyestuffs.

In testimony whereof, we affix our signatures.

KARL DAIMLER.
KARL PLATZ.